United States Patent
Ziv et al.

(10) Patent No.: US 11,540,119 B2
(45) Date of Patent: Dec. 27, 2022

(54) SYSTEM AND METHOD FOR PROVIDING SECURE AND RELIABLE COMMUNICATION OVER A LOW-ENERGY WIRELESS COMMUNICATION PROTOCOL

(71) Applicant: Wiliot, LTD., Caesarea (IL)

(72) Inventors: Dotan Ziv, Tel Aviv (IL); Tomer Avrahani, Tel Aviv (IL); Asaf Richtman, Ramat Hashofet (IL)

(73) Assignee: WILIOT, LTD., Caesarea (IL)

( * ) Notice: Subject to any disclaimer, the term of this patent is extended or adjusted under 35 U.S.C. 154(b) by 218 days.

(21) Appl. No.: 16/783,539

(22) Filed: Feb. 6, 2020

(65) Prior Publication Data
US 2021/0250759 A1    Aug. 12, 2021

(51) Int. Cl.
| | |
|---|---|
| H04L 29/06 | (2006.01) |
| H04W 12/03 | (2021.01) |
| H04W 12/06 | (2021.01) |
| H04L 9/08 | (2006.01) |
| H04W 12/041 | (2021.01) |
| H04W 12/106 | (2021.01) |
| H04L 9/00 | (2022.01) |

(52) U.S. Cl.
CPC ........... *H04W 12/03* (2021.01); *H04L 9/0869* (2013.01); *H04W 12/041* (2021.01); *H04W 12/06* (2013.01); *H04W 12/106* (2021.01); *H04L 9/50* (2022.05); *H04L 2209/80* (2013.01)

(58) Field of Classification Search
CPC ... H04W 12/03; H04W 12/041; H04W 12/06; H04W 12/106; H04L 9/0869; H04L 2209/38; H04L 2209/80
See application file for complete search history.

(56) References Cited

U.S. PATENT DOCUMENTS

| | | | |
|---|---|---|---|
| 8,516,132 B2 * | 8/2013 | Selgas | H04L 61/20 |
| | | | 709/228 |
| 9,407,634 B2 | 8/2016 | Martin et al. | |
| 9,801,059 B2 | 10/2017 | Ziv et al. | |
| 10,107,926 B1 * | 10/2018 | Elder | G01V 1/24 |
| 2012/0281699 A1 | 11/2012 | Jia et al. | |
| 2016/0019512 A1 * | 1/2016 | Buchheim | G06Q 20/3278 |
| | | | 705/73 |

(Continued)

FOREIGN PATENT DOCUMENTS

| | | | | |
|---|---|---|---|---|
| CN | 109891423 A | * | 6/2019 | ........... H04L 9/0822 |
| EP | 2942928 A1 | | 11/2015 | |

(Continued)

OTHER PUBLICATIONS

International Search Report and Written Opinion of International Searching Authority for PCT/IB2021/050883, ISA/IL, Jerusalem, Israel, dated Apr. 12, 2021.

*Primary Examiner* — Shawnchoy Rahman
(74) *Attorney, Agent, or Firm* — M&B IP Analysts, LLC (57) ABSTRACT

A system and method for encrypting a data frame of a low-power communication protocol. The method includes providing an input data frame, the input date frame includes a random number, a unique identifier, and a payload data, encrypting the payload data, generating a Message Integrity Code (MIC), generating a rotating identifier by encrypting the unique identifier, and generating an output frame based on the generated rotating identifier, the generated MIC, and the encrypted payload data.

15 Claims, 7 Drawing Sheets

(56) References Cited

U.S. PATENT DOCUMENTS

| | | | |
|---|---|---|---|
| 2016/0182432 A1 | 6/2016 | De et al. | |
| 2016/0330213 A1* | 11/2016 | Vijayasankar | H04L 9/0819 |
| 2017/0187724 A1* | 6/2017 | Lee | H04L 63/12 |
| 2018/0183274 A1* | 6/2018 | Auten | H02J 50/23 |
| 2018/0189528 A1* | 7/2018 | Hanis | G06Q 30/0185 |
| 2019/0204403 A1* | 7/2019 | Booij | G01S 1/725 |
| 2019/0387401 A1* | 12/2019 | Liao | H04W 8/08 |
| 2019/0394172 A1 | 12/2019 | Hersent | |
| 2020/0037157 A1 | 1/2020 | Agarwal et al. | |
| 2020/0145804 A1* | 5/2020 | Elboim | H04L 67/12 |
| 2020/0259635 A1* | 8/2020 | Junk | G05B 19/042 |

FOREIGN PATENT DOCUMENTS

| | | | |
|---|---|---|---|
| EP | 2999297 A2 | 3/2016 | |
| EP | 3223452 A1 | 9/2017 | |

\* cited by examiner

SYSTEM AND METHOD FOR PROVIDING SECURE AND RELIABLE COMMUNICATION OVER A LOW-ENERGY WIRELESS COMMUNICATION PROTOCOL

TECHNICAL FIELD

The present disclosure relates generally to a system and method for providing secure and reliable communication over un-secured low-energy wireless communication protocol.

BACKGROUND

Bluetooth advertising is a method of mobile marketing that utilizes Bluetooth Low Energy (BLE) technology to deliver content to wireless devices. Typically, the content may be transmitted by a beacon from a location over a non-secured channel and received by a wireless device equipped with a BLE scanner. Such a BLE beacon may also be described as a Non-Connectable Advertising packet.

At the same time, beacon transmissions, as performed by the BLE protocol, is subject to a variety of cyber threats, as communication is not encrypted. One example for such threats is unauthorized tracking, where beacon broadcast IDs are available to read by any nearby receiver. In this case, an attacker or hacker can listen and analyze the non-secured beacon. Another example for such a cyber threat is forgery, where an attacker or hacker can forge the advertisement packets of any beacon broadcasting a consistent ID. Also called spoofing, or the act of disguising a communication from an unknown source as being from a known, trusted source, spoofing can be used to gain access to a target's personal information, spread malware through infected links or attachments, bypass network access controls, or redistribute traffic to conduct a denial-of-service attack.

Another cyber threat includes showrooming, where BLE beacons are often used to identify micro location. With this information, an attacker or hacker can use the beacon information of the owner to offer competing services to others located in that location. Yet another cyber threat is piggybacking tracking, where an eavesdropper may use a widely deployed mobile application to collect identifiers and their locations, and use the collected information to later infer the beacon's historical location once the beacon's ID is learned.

One security mechanism in protecting BLE beacons involves random generation of Media Access Control (MAC) addresses. This mechanism randomly generates MAC addresses assigned to a wireless device, when the device is connected to a new BLE network. A different randomized MAC address is used per connection attempt. The security mechanism can potentially prevent one from using MAC addresses to build a history of device activity, thus increasing user privacy. However, such a security mechanism provides anonymity for the user rather than providing security against unauthorized access to user information. In many cases, broadcast-only application requires additional application-level security for data payloads.

Another security solution for securing BLE beacon includes advertising. A rotated identifier is generated using a cryptographic method and can only be linked back to the beacon, or information associated with the beacon, by authorized users. Thus, the beacon's owner can identify the rotated identifier, while for other devices the rotated identifier would look like random ID. Here, the owner of the beacon can register the beacon with a cloud based global resolver, which enables authorized non-owners to identify the beacon. However, with this method, the payload data is not secured, but rather only the identifier is.

In view of the above discussion, there is a need for a security solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for encrypting a data frame of a low-power communication protocol. The method includes providing an input data frame, the input date frame includes a random number, a unique identifier, and a payload data, encrypting the payload data, generating a Message Integrity Code (MIC), generating a rotating identifier by encrypting the unique identifier, and generating an output frame based on the generated rotating identifier, the generated MIC, and the encrypted payload data.

Certain embodiments disclosed herein also include a battery-free IoT device for encrypting a data frame of a low-power communication protocol. The battery-free IoT device includes a microcontroller, and a memory, the memory containing instructions that, when executed by the microcontroller, configures the IoT device to provide an input data frame, the input data frame including a random number, a unique identifier, and a payload data, encrypt the payload data, generate a Message Integrity Code (MIC), generate a rotating identifier by encrypting the unique identifier, and generate an output frame based on the generated rotating identifier, the generated MIC, and the encrypted payload data.

Certain embodiments disclosed herein further include a wireless device for encrypting a data frame of a low-power communication protocol. The wireless device includes a processor, and a memory, the memory containing instructions that, when executed by the microcontroller, configures the processor to provide an input data frame, the input data frame including a random number, a unique identifier, and a payload data, encrypt the payload data, generate a Message Integrity Code (MIC), generate a rotating identifier by encrypting the unique identifier, and generate an output frame based on the generated rotating identifier, the generated MIC, and the encrypted payload data.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for implementing a secured broadcast authentication scheme and providing a secured beacon packet that allow for both user anonymity and data security. In an example embodiment, the system is configured to provide for anonymization, and privacy. That is, data transmitted is anonymized and encrypted to protect the owner's privacy. In particular, the beacon's unique identity is anonymized. To this end, authentication and integrity protection fields are added to beacon packets. This enables the receiver to apply authentication and integrity protection method to the frames. In an embodiment, replay protection data is also inserted to beacon packets to enable the receiver to apply replay detection method to the beacon packets.

Figure 1:
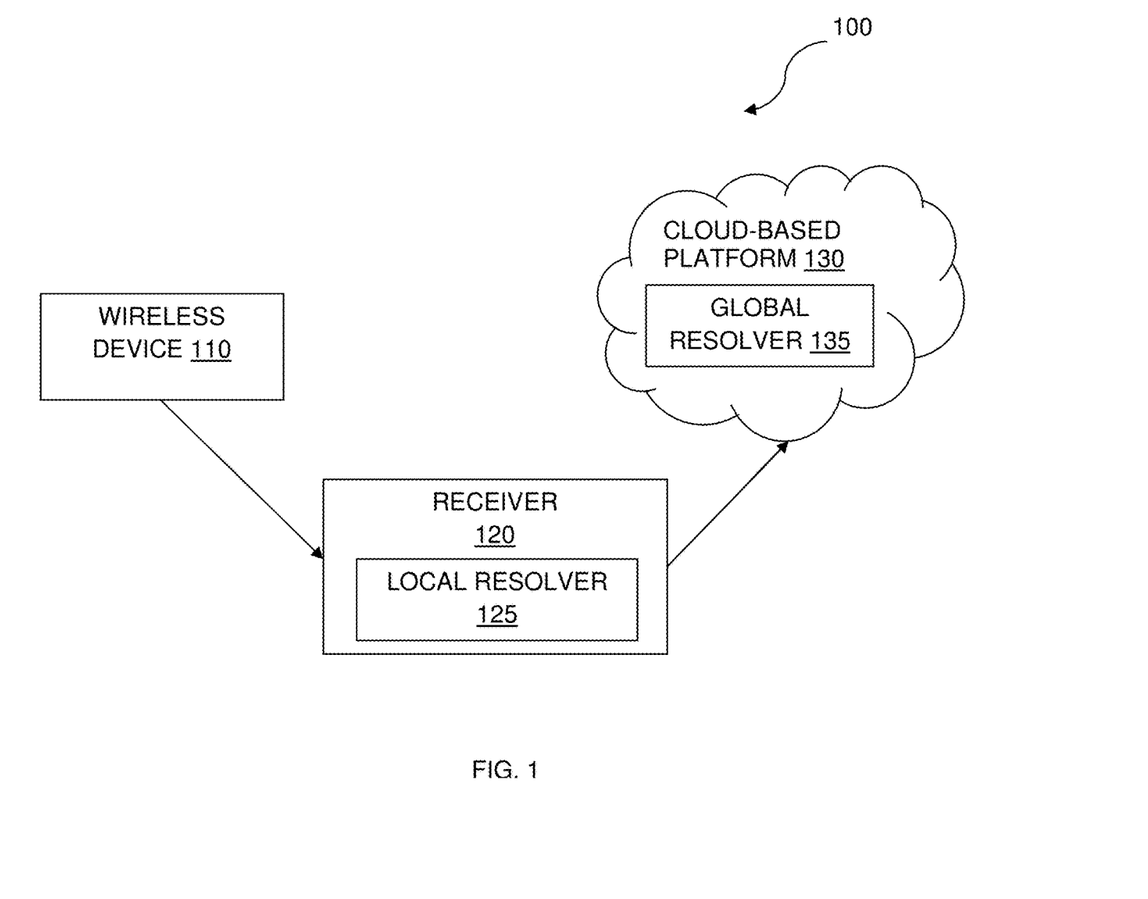
FIG. 1 is a schematic diagram of a secure low energy communication system according to an embodiment.

FIG. 1 is an example schematic diagram of a secure low energy communication system 100 utilized to describe the various embodiments. The system 100 includes a wireless device 110, a receiver 120, and a cloud-computing platform 130. Communication among the wireless device 110 and the receiver 120 may be performed using a low-energy communication protocol. The communication between the cloud-computing platform 130 and the receiver 120 is over, for the example, the Internet.

In an example embodiment, the low-energy communication protocol includes a Bluetooth Low Energy (BLE) protocol, which are short-wavelength radio waves operating at a range of about 2.40 to 2.485 MHz, and commonly used among portable wireless devices. The cloud-computing platform 130 may include a public cloud, a private cloud, a hybrid cloud or combination thereof.

The receiver 120 may be, but is not limited to, a gateway embodied as, for example, a personal computer, a laptop, a tablet computer, a smartphone, a wearable computing device, or any other device capable of receiving and displaying notifications. The receiver 120 may also communicate with a network (other than BLE networks), such networks include local area network (e.g., Wi-Fi), the Internet, and the like.

The receiver 120 further includes a local resolver 125. The local resolver 125 is configured to process to resolve beacon packets received from the wireless device 110. As will be described below, this includes at least resolving the unique ID and a group ID of the wireless device 111 as well as decrypting payload data. In an embodiment, the local resolver 125 may be further configured to detect reply attack based on unique ID included in each received packet. In an embodiment, the local resolver 125 may be realized as a software agent installed in the receiver 120. An example block diagram of the receiver 120 is provided in FIG. 6.

The global resolver 135 included in the cloud-computing platform 130 may perform the same function as the local resolver 125. When packets are resolved by the global resolver 135, encrypted packets are sent to the cloud-computing platform 130 over the Internet (through the receiver 120). Thus, in such configuration, the local resolver 125 does not resolve the encrypted packets.

In an embodiment, both the local resolver 125 and the global resolver 135 may store identity (encryption) keys of packets, either locally at the receiver 120, or over cloud over the cloud-computing platform 130. The encryption keys may be any type of cryptographic keys and are typically generated during manufacturing. In an embodiment, the local resolver 125 stores the encryption keys of packets.

In an embodiment, the wireless device 110 is a transmit-only type energy harvesting device. Within the wireless device 110, which may be stateless, encryption keys may be stored in a non-volatile memory (not shown) in the device 110. Therefore, each packet transmitted by the wireless device 110 may be encrypted, authenticated and integrity protected independently of all other packets. That is, authentication and integrity protection fields may be utilized, as further discussed with reference to FIG. 2.

Figure 2:
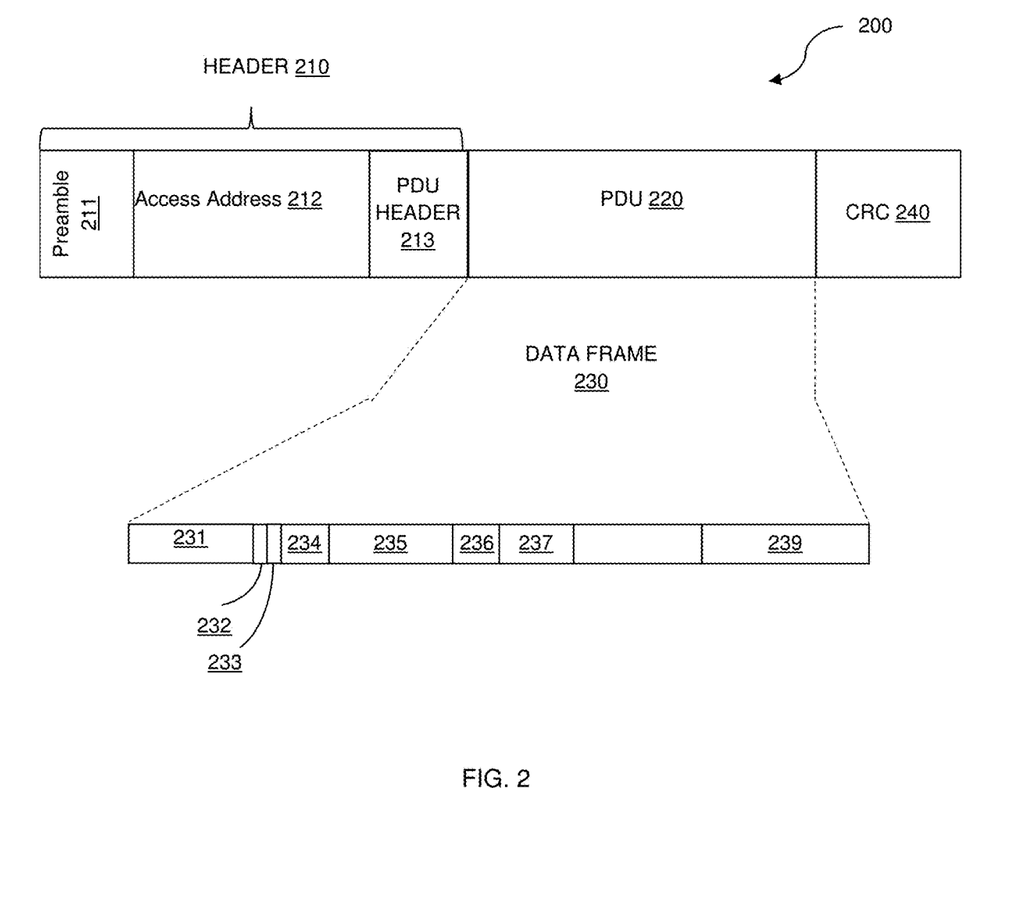
FIG. 2 is a diagram of a beacon packet format according to an embodiment.

In operation, the wireless device 110 is configured to encrypt and broadcast beacon packets encrypted using the disclosed embodiments. In BLE, the beacon packets are broadcast as standard advertisement packets (hereinafter a "beacon packet" or simply a "packet") over advertising channels 37, 38, and 39 defined as part of the BLE protocol. In an embodiment, the beacon packet has a specific format as shown in FIG. 2, and a portion of each beacon packet is encrypted by the wireless device 110. In another embodiment, the data sent in the beacon packet may be of a manufacturer data type, which is a valid Advertisement Data type. It should be noted that only beacon packets are encrypted by the wireless device 110. It should be further noted that the format of the beacon packet complies with the BLE standard.

FIG. 2 shows an example diagram of a beacon packet 200 that includes a header 210 and an advertising channel payload, also known as a Protocol Data Unit (PDU) 220. The header 210 includes the following fields: a preamble 211 used for internal protocol management; an access address 212 providing an access for the beacon packet; and a PDU header 213 containing PDU type and length. The beacon packet 200 also includes a Cyclic Redundancy Check (CRC) field 240 having a CRC code computed over the contents of the PDU 220.

The PDU 220 is structured according to the disclosed embodiment and will be referred to as a data frame 230. The data frame 230 is the portion of the beacon packet 200 being encrypted, or otherwise manipulated. The data frame 230 includes the following fields: an advertisement (ADV) address 231 containing a random number generated for each frame; a vendor header that includes advertisement (ADV) length 232 containing the length of the data frame 230, manufacturer data 233 computed by the BLE protocol and is of an Advertisement Data (AD) Type; a manufacture ID 234 containing a number defined by a manufacture of the wireless device 110; a unique Identifier (ID) 235 containing an unique ID value; a group ID 236; a nonce 237 containing a random generated number; and the payload data 239.

According to the disclosed embodiments, the unique ID 235 is randomized or otherwise encrypted, while the group ID 236 is sent as unencrypted raw data. The unique ID 235 may be six bytes long, and identifies a specific wireless device 110, and is unique per wireless device 110. Also, the group ID 236 denotes a wireless device 110's group ID, and is used for local filtering and ID resolution. By encrypting the unique ID 235, an attacker cannot track the activity of the wireless device 110 or forge the advertisement beacon packets 200.

The nonce 237 is a random or non-repeating number that is included in the data frame 230 exchanged by the protocol and used just once in a cryptographic communication. The nonce 237 is used to provide replay protection by guaranteeing the transmittal of live data rather than replayed data. That is, the nonce 237, in an embodiment, prevents reuse of old communication, and further allows for detecting and protecting against replay attacks. As an example, the nonce 237 may be four bytes long.

Further, the contents of the payload data 239 field are encrypted. By encrypting the payload data 239, anonymization and privacy are achieved. It should be noted that the structure of a data frame 230, and hence a beacon packet 200 remains the same after encrypting the relevant fields, while the contents of the data frame 230 change. The encryption process is discussed in further detail below.

In another embodiment, the replay attacks are detected based on the nonce 237. To this end, the local resolver 125 (or the global resolver 135) compares the nonce numbers designated in consecutive received beacon packets 200. If the one or more such nonce numbers 237 match, then a replay attack is detected. As all nonce numbers 237 are normalized, it is expected that no two nonce numbers 237 will be similar. Data frames 230 with duplicated nonce numbers 237 are discarded. The detection of replay attacks can be performed by the local resolver 125 or the global resolver 135.

Figure 3:
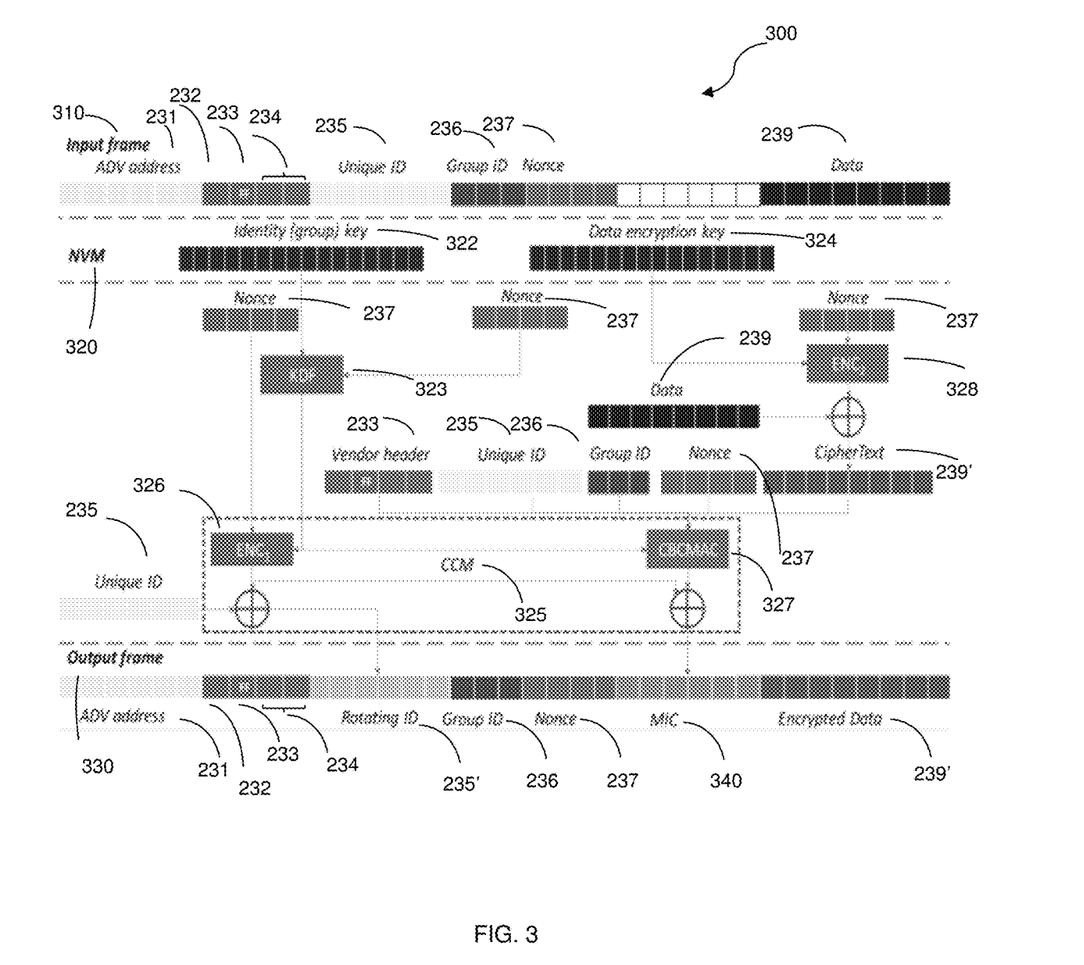
FIG. 3 is a functional diagram of a security protocol data encryption flow according to an embodiment.

FIG. 3 is an example functional diagram 300 of a security protocol data encryption flow according to an embodiment. An input data frame 310, is being encrypted. The input data frame 310 is formatted as described in FIG. 2. The input data frame 310 includes at least the following fields: the advertisement (ADV) address 231 containing the random number generated for each frame; the advertisement (ADV) length 232; the manufacturer data 233; the manufacture ID 234; the unique Identifier (ID) 235; the group ID 236; the nonce 237; and the payload data 239.

In comparison to the input frame 310, an output frame 330 is generated from the encryption, and includes at least the ADV address 231; the advertisement (ADV) length 232; the manufacturer data 233; the manufacturer ID 234; a rotating ID 235'; the group ID 236; the randomly generated nonce 237; a Message Integrity Code (MIC) 238, which is a code computed over all the fields in the data frame 230 (excluding the MIC); and an encrypted payload data 239'.

As can be seen in FIG. 3, the output frame 330 has a similar general structure as the input data frame 310, and includes the same successively arranged ADV address 231, the advertisement (ADV) length 232, the manufacturer data 233, the manufacturer ID 234, the group ID 236, and the nonce 237. However, the encrypted rotating Unique ID 235' and the encrypted payload data 239' are generated in place of where the unique ID 235 and the payload data 239 were originally. Also, the MIC is generated and inserted between the nonce 237 and the encrypted payload data 239'.

In an embodiment, the encryption is performed using encryption keys that are typically stored in a Non-Volatile Memory (not shown in FIG. 3) in the wireless device (e.g., device 110). These keys may include an identity (group) key 322 and a data encryption key 324. These keys may further be used to derive identity encryption key 326, which may also be known as a first symmetric block encryption algorithm (ENC1), and integrity key (ENC2) 328, which may also be known as a second symmetric block encryption algorithm (ENC2).

The identity key 322 is shared by all wireless devices 110 with the same group ID 236, and is used for encryption of the unique ID 235. The identity key 322 ensures encrypted packet integrity and protection by authenticating the wireless device 110. The identity key 322 may include a 128 bits AES key by default.

In contrast to the identity key 322, the data encryption key 324 is unique to each wireless device 110, and is used to encrypt the payload data 239. As an example, a 128 bits Advanced Encryption Stand (AES) key may be used for the data encryption. Copies of the identity key 322 and the data encryption key 324 may be stored by the local resolver 125 or the global resolver 135, to resolve received encrypted packets.

Additionally, cryptographic primitives are used by the security protocol. The cryptographic primitives include a Key Derivation Function (KDF) 323, a Counter with Cipher Block Chaining-Message Authentication Code mode (CCM) 325, and a Cipher Block Chaining-Message Authentication Code (CBCMAC) 327.

Encryption of the data frame 230 will now be described.

Data Encryption

To encrypt payload data 239, the integrity key 328 is derived using the data encryption key 324 and the nonce 237. The payload data 239 is then combined with the integrity key 328 and encrypted into encrypted payload data 239', or ciphertext.

Integrity Protection

Further, to protect integrity of the data frame 230, the MIC 340 is generated over all the fields of the packet, excluding the MIC 340 itself, using the CCM mode 325. That is, the MIC 320 is a Message Authentication Code (MAC) over the unique ID 235, the nonce 237, the group ID 236, the encrypted payload data 239', and the integrity key 328.

First, the nonce 237, the vendor header that includes the ADV length 232, the manufacturer data 233, and the manufacture ID 234, the unique id 235, the group ID 236, and the encrypted payload data 239' are formatted. Also, the counter blocks (not shown) including the nonce 237 are also formatted.

Also, the KDF 323, which derives one or more secret keys from a secret value such as a master key, is obtained from the identity (group) key 322 and the nonce 237. The obtained KDF 323 may then be applied in two ways. First, the KDF 323 is used with another nonce 237 supplied by the counter (not shown) to derive the identity encryption key 326 within the CCM 325. Second, the KDF 323 is also used with the formatted nonce 237, vendor header 233, unique id 235, and the encrypted payload data 239' to derive the CBCMAC 327.

The derived CBCMAC 327 is then combined with the identity encryption key 326 to derive the MIC 340.

Identity Encryption

Besides encryption of payload data 239 and the derivation of the MIC 340, the unique ID 235 of the data frame 230 is also encrypted. This may be performed by applying the KDF 323 derived from the nonce 237 and the identity (group) key 322, and then deriving the identity encryption key 326 from the derived KDF 323 and the formatted nonce 237 derived from the counter block. Next, the unique ID 235 is then combined with the identity encryption key 326 to derive the encrypted rotating ID 235'.

With the encrypted payload data 239', the derived MIC 340, and the encrypted rotating ID 235', the output frame 330 is constructed, which includes at least the ADV address 231, the vendor header that includes the ADV length 232, the manufacturer data 233, and the manufacture ID 234, the rotating ID 235', the group ID 236, the randomly generated nonce 237, the Message Integrity Check (MIC) 238, and the encrypted payload data 239' arranged in succession.

As noted above, the identity encryption key (ENC1) 326 and the integrity key (ENC2) 328 are authentication encryptions, used to encrypt the wireless device 110's unique ID 235 and payload data 239, respectively, and to protect the integrity and authenticity of the entire beacon packet 200.

In operation, the data frame 230 is input as input frame 310 and encrypted based on the protocol described above. The output frame 330 is generated. The data frame 230 is now encrypted and ready to be transmitted by the wireless device 110.

On the receiver (e.g., receiver 120, FIG. 1) side, upon receiving the encrypted beacon packet 200 from the wireless device 110, by the local resolver 125, additional plural nonce 237 are generated as needed. If the group ID 236 is recognized by the local resolver 125, then the identity key 322 is retrieved. Alternatively, the cloud computing platform 130 may be asked for the identity key 322. The MIC 340' is then computed using the CCM 225 integrity protection. If the computed MIC 340' matches the MIC 340 received from the wireless device 110, Rotating ID 235' is decrypted.

During the decryption of the rotating ID 235', a data frame 230 is constructed based on the unique ID 235 encryption techniques described above. The Rotating ID 235' is then decrypted with the identity key 322 to recover the unique ID 215. Here, the description is independent of the MIC 340' calculation, and the process does not output the decrypted blocks before the MIC 340 is verified to prevent leakage of confidential information to the attacker. Afterwards, the decrypted beacon packet 200 is sent to the cloud computing platform 130, with the unique ID 235.

As an alternative, if the global resolver 135 is used to decrypt the beacon packet 200, on the global resolver 135 side, beacon packet 200 and the unique ID 215 are received. As an option, the MIC 340 may be re-verified, and the beacon packet 200 may be dropped if MIC 340 is unverified. After, the unique ID 235 is used to retrieve the data encryption key 324. If the unique ID 215 is not found, the beacon packet 200 is dropped.

Thereafter, the output data frame 330 is constructed according to the encryption techniques disclosed herein. Then, the output frame 330 is decrypted with the data encryption key 324, and subjected to an Exclusive OR "XOR" operation with the encrypted payload data 239' to recover the original payload data 239.

It should be noted that the disclosed embodiments result in secure, broadcasted, encrypted BLE communication. In an example, assuming two beacons from the same group using the same identity key and the same nonce, the attacker intercepting both packets, would identify that the packets were sent by different beacons. Normally, if an attacker knows that two packets are encrypted by the same key, the attacker may be able to detect bit difference (result of a bitwise exclusive OR "XOR" operation) is between the unique IDs of the beacons. However, when utilizing the disclosed encryption techniques, the unique IDs are random and will not provide the attacker any information regarding the unique ID or the encryption keys being used.

Figure 4:
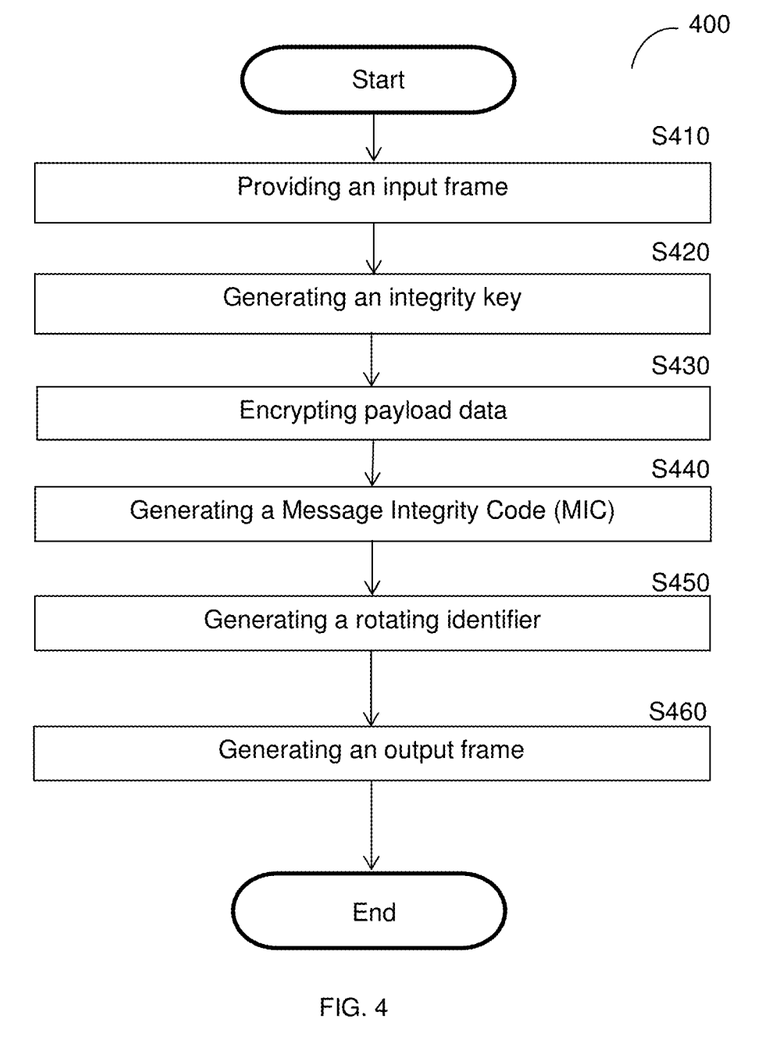
FIG. 4 is a flowchart for a method of encrypting a low energy beacon, according to an embodiment.

FIG. 4 is an example flowchart for a method 400 of encrypting a BLE beacon packet according to an embodiment. The method will be described with reference to the various elements discussed with reference to FIG. 3.

At S410, an input frame 310 is provided. For the purpose of encryption, a plurality of encryption keys is utilized. These encryption keys include at least: an identity key (322) and a data encryption key (324).

Then, at S420, an integrity key (328) is generated based on the random number (or nonce) (237), and the data encryption key (324).

At S430, the payload data (239) is encrypted as the generated integrity key and is used to encrypt the payload data (239).

Then, at S440, the MIC (340) is generated. Here, the random number (237), the vendor header including ADV length (232), the manufacturer data (233), and the manufacturing ID (234), the group ID (236), the unique ID (235), and the encrypted payload data (239') of the input frame are formatted. Also, counter blocks (not shown), which include the random number 237, are also formatted.

Next, the KDF (323) is obtained based on the identity (group) key (322) and the random number (237). Afterwards, the CBCMAC (327) is derived based on the obtained KDF (323) and the formatted counter block (not shown). The identity encryption key (326) is then generated based on the formatted counter block (not shown) including the random number (237), and the generated identity encryption key (326) and the CBCMAC (327) are combined to derive the MIC (340).

At S450, the rotating ID (235') is generated by applying the generated identity encryption key (326) to the unique ID (235). Then, at S460, the output frame (330) is constructed based on the generated rotating identifier (235'), the generated MIC (340), the encrypted payload data (239'), and the output frame (330) is transmitted to the receiver 120.

The method disclosed above provide a secure transfer of beacon packets by a wireless device over a low energy communication protocol.

Figure 5:
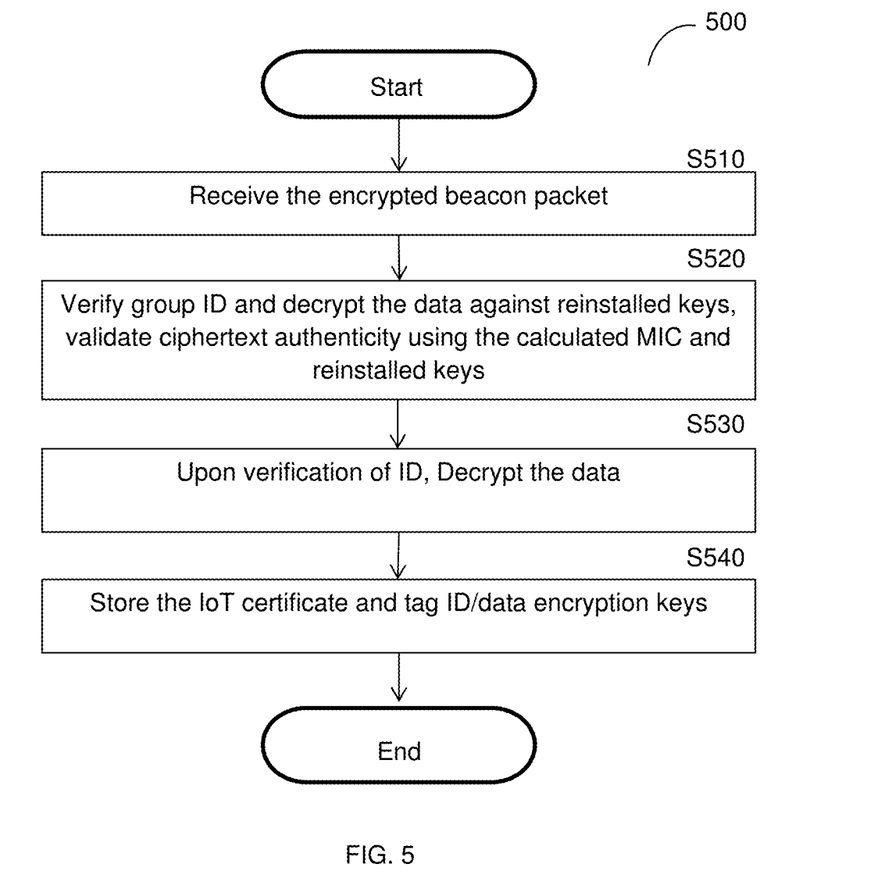
FIG. 5 is a schematic diagram of decrypting an encrypted low energy beacon, according to an embodiment.

FIG. 5 is an example flowchart 500 for a method of decrypting the encrypted beacon packet 200, according to an embodiment. The method will be described with reference to the various elements discussed with reference to FIG. 3.

At S510, an encrypted beacon packet is received. The packet is received at a resolver, such as the local or global resolver discussed above. At S520, integrity of the encrypted beacon packet is verified by computing the MIC (340') and comparing with the MIC (340) received from the wireless device. Also, the group ID (236) is resolved via recognition by the local resolver (125), and the identity key (322) is retrieved.

If the encrypted packet beacon is verified, then at S530 the rotating ID (235') and the encrypted payload data (239') are decrypted using the various keys including the identity key (322) and the data encryption key 324.

At S540, the decrypted beacon packet is transferred for further processing. Such processing includes data calibration and virtual device service including storage, analysis, and notification, and control by the receiver 120.

Figure 6:
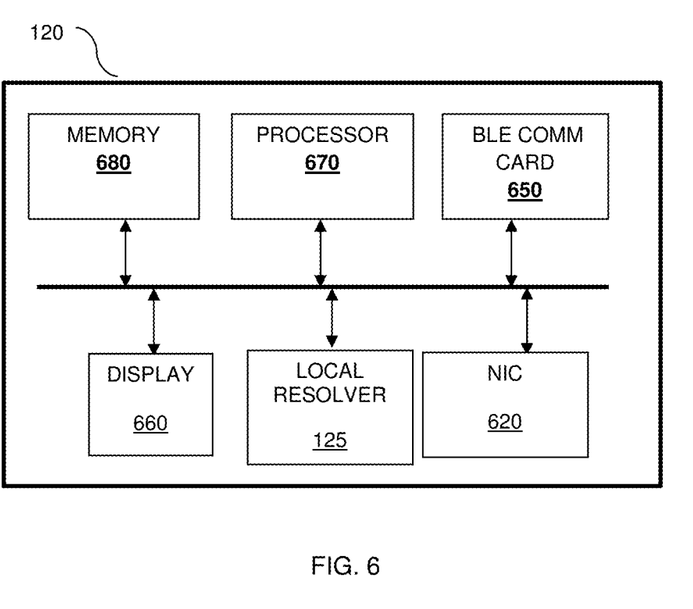
FIG. 6 is a block diagram of an exemplary receiver according to an embodiment.

FIG. 6 is an example detailed block diagram of an exemplary receiver 120 according to an embodiment. As illustrated in FIG. 6, receiver 120 include a BLE communication card 650 and a Network Interface Card (NIC) 620. The BLE card 650 communicates with the wireless device 110 over a BLE network (not shown), while the NIC 620 allows communication with a server over the Internet (not shown), or other type of network.

In an embodiment, the receiver 120 may be installed with an application (not shown) that, when executed by hardware such as the processor 670, may allow the processor 670 to control the communication with a wireless device (e.g., device 110) and the cloud-based platform 130 and perform the decryption method as described in FIG. 5. The application, which may include the local resolver 125, may be stored in the memory 680. That is, as discussed above with regard to FIG. 5, the local resolver 125 receives, decrypts, and processes data packets from the wireless device 110, and may also store identity keys of the packets in the memory 680.

It should be noted that processor 670 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 680 may be volatile (e.g., RAM, etc.), non-volatile (e.g., ROM, flash memory, etc.), or a combination thereof. The memory 680 may store the encryption keys. The application, which may include the local resolver 125, is realized in software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processor 670, cause the execution of the local resolver 125 over the receiver 120 to perform the method as described above with regard to FIG. 5.

Figure 7:
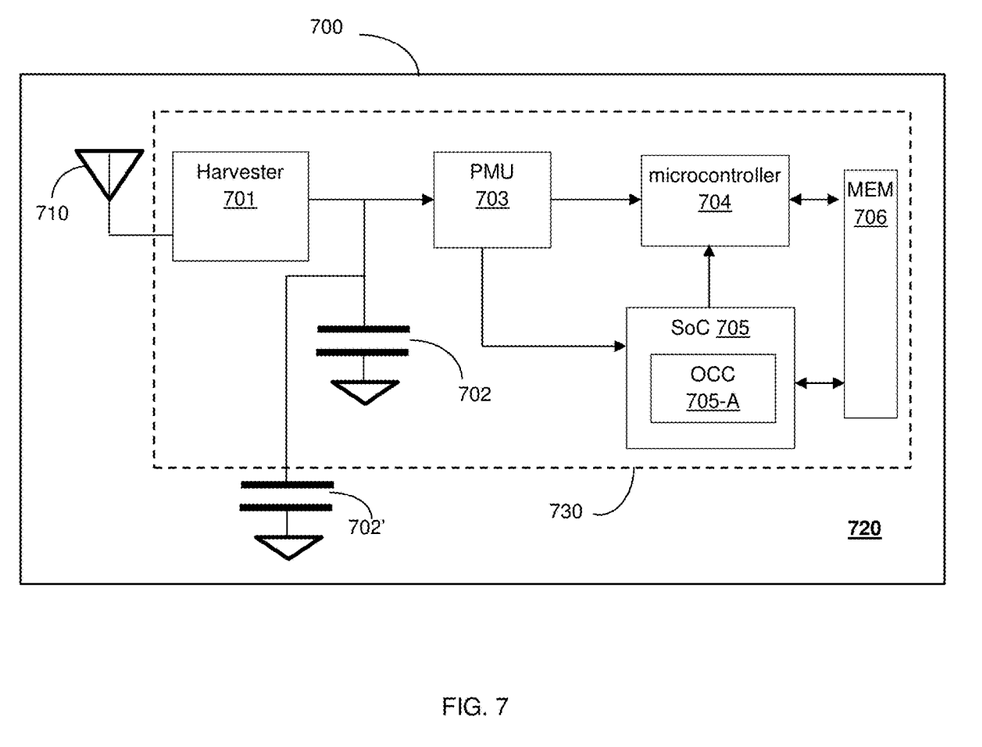
FIG. 7 shows a schematic diagram of an exemplary BLE device embodied as an IoT tag, designed according to an embodiment.

FIG. 7 shows an example schematic diagram of a wireless Internet of Things (IoT) tag 700 that can function as the wireless device 110 according to one embodiment. In such configuration, the form factor of the wireless device, hence the IoT tag 700 is an on-die package-less.

The IoT tag 700, as schematically demonstrated in FIG. 7, includes an energy harvester 701, coupled to an on-die capacitor 702 and an external passive capacitor 702', a Power Management Unit (PMU) 703, a microcontroller 704, a System on Chip (SoC) 705, and a retention memory 706. The IoT tag 700 further may include at least one antenna 710 glued to a substrate 720, for example. In another embodiment, the antenna 710 may be printed on the substrate or etched to the substrate. In a further embodiment, a passive external capacitor 730 may take the place of the antenna 710.

In an embodiment, the substrate 720 is made of a low-cost material, such as, but not limited to, polyethylene (PET), polyimide (PI), and polystyrene (PS). In another embodiment, the substrate 720's pattern (layout) can be any of aluminum, copper, or silver. The glue utilized to glue to die and/or antenna 710 may be include materials such as an Anisotropic Conductive film (ACP), any type of conductive glue, solder past, and the like.

In the embodiment shown in FIG. 7, the antenna 710 is coupled to the harvester 701 and may be utilized for energy harvesting as well as wireless communication. In some embodiments, multiple antennas may be utilized to harvest energy at multiple frequency bands. Other embodiments may include one or more antenna for energy harvesting and an antenna to receive/transmit wireless signals at the BLE frequency band.

The SoC 705 includes a number of execution functions realized as analog circuits, digital circuits, or both. Examples for such execution functions are provided below. The SoC 705 is also configured to carry out processes independently or under the control of the microcontroller 704. Each process carried out by the SoC 705 also has a state, and processes can communicate with other processes through an IPC protocol. In the configuration illustrated in FIG. 7, the SoC 705 and/or the microcontroller 704 loads the context of processes and reads data from the retention memory 706.

In an embodiment, the SoC 705 is partitioned into multiple power domains. Each power domain is a collection of gates powered by the same power and ground supply. To reduce the power consumption, only one power domain is turned on during execution.

In a preferred embodiment, the SoC 705 includes an Oscillator Calibration Circuit (OCC) 705-A. The OCC 705-A includes at least one Frequency Locking Circuit (FLC), each of which is coupled to an oscillator (both are not shown). The FLC calibrates the frequency of an oscillator using an over-the-air reference signal. In an embodiment, the calibration of the respective oscillator is performed immediately prior to a data transmission session and remains free running during the data transmission session. The FLC can be realized using Frequency Locked Loop (FLL), a Phased Locked Loop (PLL), and a Delay Locked Loop (DLL).

According to the disclosed embodiments, the energy harvester 701, the capacitor 702, PMU 703, microcontroller 704, SoC 705, and retention memory 707 are integrated in a die 730. The die 730 is glued to the substrate 720. The wireless device 110 does not include any external DC power source, such as a battery.

In an embodiment, the microcontroller 704 implements electronic circuits (such as, memory, logic, RF, etc.) performing various functions allowing communication using a low energy communication protocol. In a preferred embodiment, the microcontroller 704 operates using a Bluetooth Low energy (BLE) communication protocol. In some embodiments, the microcontroller 704 is integrated with wireless sensors (not shown) to a complete an IoT device functionality.

The harvester 701 is configured to provide multiple voltage levels to the microcontroller 704, while maintaining a low loading DC dissipation value. In an example implementation, the energy harvester 701 may include a voltage multiplier coupled to the antenna 710. The voltage multiplier may be a Dickson multiplier, while the antenna is a 710 receive/transmit antenna of the microcontroller 704. That is, in such a configuration, the antenna is primarily designed to receive and/or transmit wireless signals according to the respective communication protocol of the low-energy wireless device 110 (e.g., 2.400-2.4835 GHz signal for BLE communication).

It should be noted that the antenna 710 may also be designed for energy harvesting and may operate on a different frequency band, direction, or both, than those defined in the standard of the respective communication protocol. Regardless of the configuration, energy can be harvested from any wireless signals received over the air. Alternatively, energy can be harvested from any other sources, such as solar, piezoelectric signals, and the like.

The harvested energy is stored in the on-die capacitor 702 and/or the external capacitor 702'.

The PMU 703 is coupled to the capacitor 702 and is configured to regulate the power to the microcontroller 704 and SoC 705. Specifically, as the capacitance of the capacitor 702 is very limited, the power consumption should be carefully maintained. This maintenance is performed to avoid draining of the capacitor 702, thus resetting the microcontroller 704. The PMU 703 can be realized using a Schmitt trigger that operates on a predefined threshold (Vref), e.g., Vref=0.85V.

In another embodiment, the PMU 703 may be further configured to provide multi-level voltage level indications to the microcontroller 704. Such indications allow the microcontroller 704 to determine the state of a voltage supply at any given moment when the capacitor 702 charges or discharges. According to this embodiment, the PMU 703 may include a detection circuitry controlled by a controller. The detection circuity includes different voltage reference threshold detectors, where only a subset of such detectors is active at a given time to perform the detection.

The wireless device 110 does not include any crystal oscillator providing a reference clock signal. According to an embodiment, the reference clock signal is generated using over-the-air signals received from the antenna 710. As noted above, in a typical deployment, a free running oscillator is locked via a phase-locked loop (PLL) to a clock, originating from a crystal oscillator. According to the disclosed embodiments, the OCC 705-A calibrates the frequency of an oscillator using an over-the-air reference signal. The oscillator(s) implemented in the IoT tag 700 are on-die oscillators and may be realized as a Digitally Controlled Oscillator (DCO).

The retention memory 706 is a centralized area in the communication system 100 that is constantly powered. Data to be retained during low power states is located in the retention memory 740. In an embodiment, the retention area is optimized to subthreshold or near threshold voltage, e.g., 0.3V-0.4V. This allows for the reduction of the leakage of the retention cells.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for encrypting a data frame of a low-power communication protocol, comprising:
   providing an input data frame, the input date frame includes a random number, a unique identifier, and a payload data;
   encrypting the payload data;
   generating a Message Integrity Code (MIC),
   generating a rotating identifier by encrypting the unique identifier; and
   generating an output frame based on the generated rotating identifier, the generated MIC, and the encrypted payload data.

2. The method of claim 1, wherein the input data frame further includes a vendor header and a group identifier.

3. The method of claim 1, further comprising:
   generating an integrity key based on the random number and a data encryption key,
   wherein the payload data is encrypted based on the generated integrity key and the payload data.

4. The method of claim 3, wherein generating the MIC further comprises:
   formatting the random number, a vendor header, a group identifier, the unique identifier of the input data frame, and the encrypted payload data, wherein the vendor header and the group identifier are part of the input data frame;

formatting a counter block, the counter block including the random number;

obtaining a Key Derivation Function (KDF) based on an identity key and the random number;

deriving a Counter with Cipher Block Chaining-Message Authentication Code (CBCMAC) based on the obtained KDF and the formatted counter block;

generating an identity encryption key based on the formatted counter block including the random number; and combining the generated identity encryption key and the CBCMAC.

5. The method of claim 4, wherein the generating the rotating identifier further comprises:

applying the generated identity encryption key to the unique identifier.

6. The method of claim 1, wherein the low-power communication protocol is a BLE protocol.

7. The method of claim 1, wherein the method is performed by a wireless device, wherein the wireless device is at least a battery-free IoT tag.

8. A battery-free IoT device for encrypting a data frame of a low-power communication protocol, comprising:

a microcontroller; and a memory, the memory containing instructions that, when executed by the microcontroller, configures the IoT device to:

provide an input data frame, the input data frame including a random number, a unique identifier, and a payload data;

encrypt the payload data;

generate a Message Integrity Code (MIC), generate a rotating identifier by encrypting the unique identifier; and generate an output frame based on the generated rotating identifier, the generated MIC, and the encrypted payload data.

9. The battery-free IoT device of claim 8, wherein the input data frame further includes a vendor header and a group identifier.

10. The battery-free IoT device of claim 8, wherein the IoT device is further configured to:

generate an integrity key based on the random number and a data encryption key;

wherein the payload data is encrypted based on the generated integrity key and the payload data.

11. The battery-free IoT device of claim 10, wherein the generating the MIC further comprises:

formatting the random number, a vendor header, a group identifier, the unique identifier of the input data frame, and the encrypted payload data, wherein the vendor header and the group identifier are part of the input data frame;

formatting a counter block, the counter block including the random number;

obtaining a Key Derivation Function (KDF) based on an identity key and the random number;

deriving a Counter with Cipher Block Chaining-Message Authentication Code (CBCMAC) based on the obtained KDF and the formatted counter block;

generating an identity encryption key based on the formatted counter block including the random number; and combining the generated identity encryption key and the CBCMAC.

12. The battery-free IoT device of claim 11, wherein the generating the rotating identifier further comprises:

applying the generated identity encryption key to the unique identifier.

13. The battery-free IoT device of claim 8, wherein the low-power communication protocol is a BLE protocol.

14. A The battery-free IoT device of claim 10, further comprising:

an energy harvester coupled to a capacitor and an antenna; and a Power Management Unit (PMU) coupled to the energy harvester, the microcontroller, and a System on Chip (SoC), wherein the SoC includes an Oscillator Calibration Circuit (OCC), and the memory is coupled to the microcontroller and the SoC.

15. A wireless device for encrypting a data frame of a low-power communication protocol, comprising:

a microcontroller; and a memory, the memory containing instructions that, when executed by the microcontroller, configures the processor to:

provide an input data frame, the input data frame including a random number, a unique identifier, and a payload data;

encrypt the payload data;

generate a Message Integrity Code (MIC)

generate a rotating identifier by encrypting the unique identifier; and generate an output frame based on the generated rotating identifier, the generated MIC, and the encrypted payload data.

* * * * *